June 21, 1949.  H. KATZ  2,473,651
ADJUSTABLE TARGET STAGE
Filed Nov. 23, 1945  2 Sheets-Sheet 1
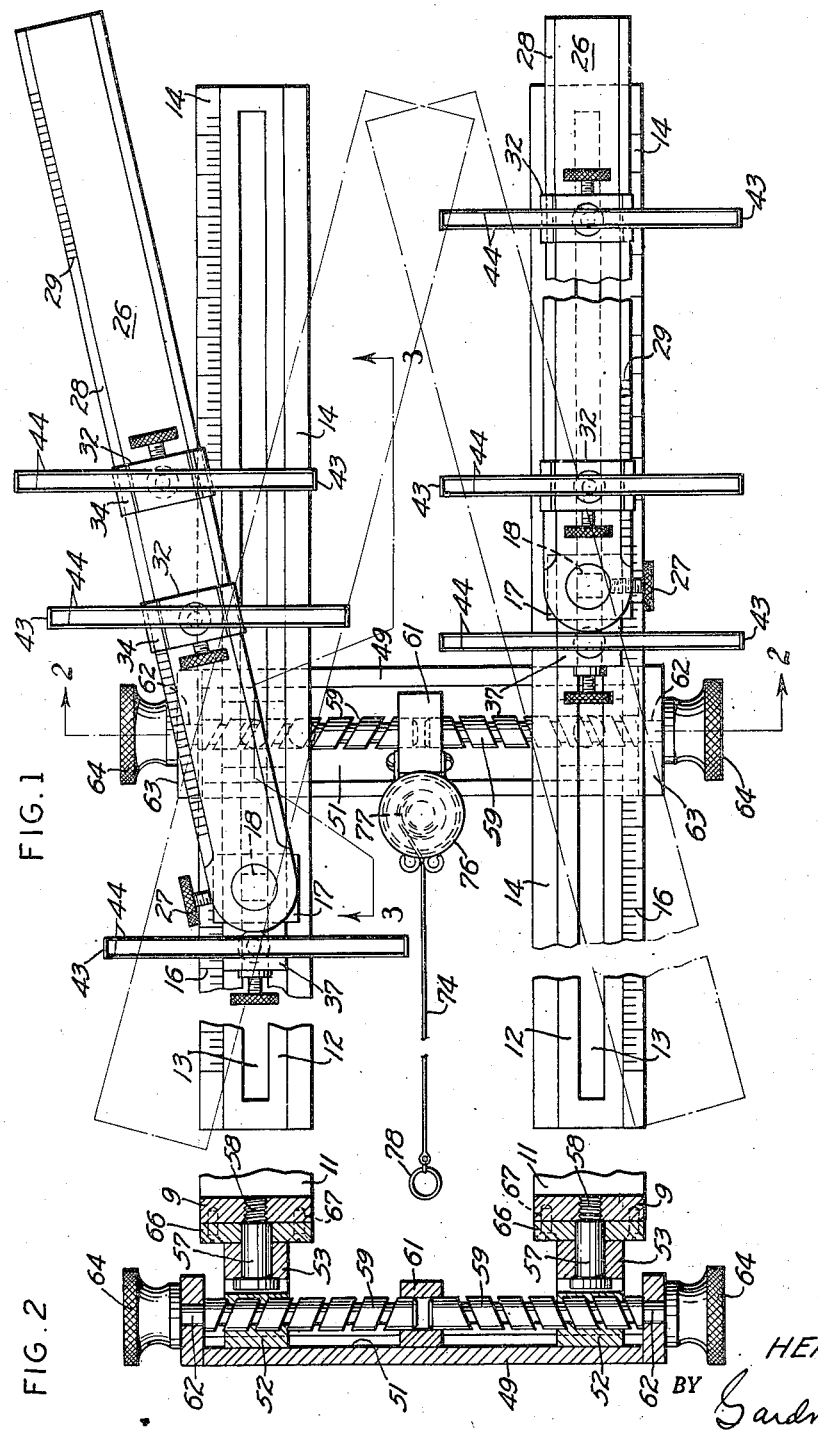
INVENTOR.
HERMAN KATZ
BY Gardner & Warren
his attys.

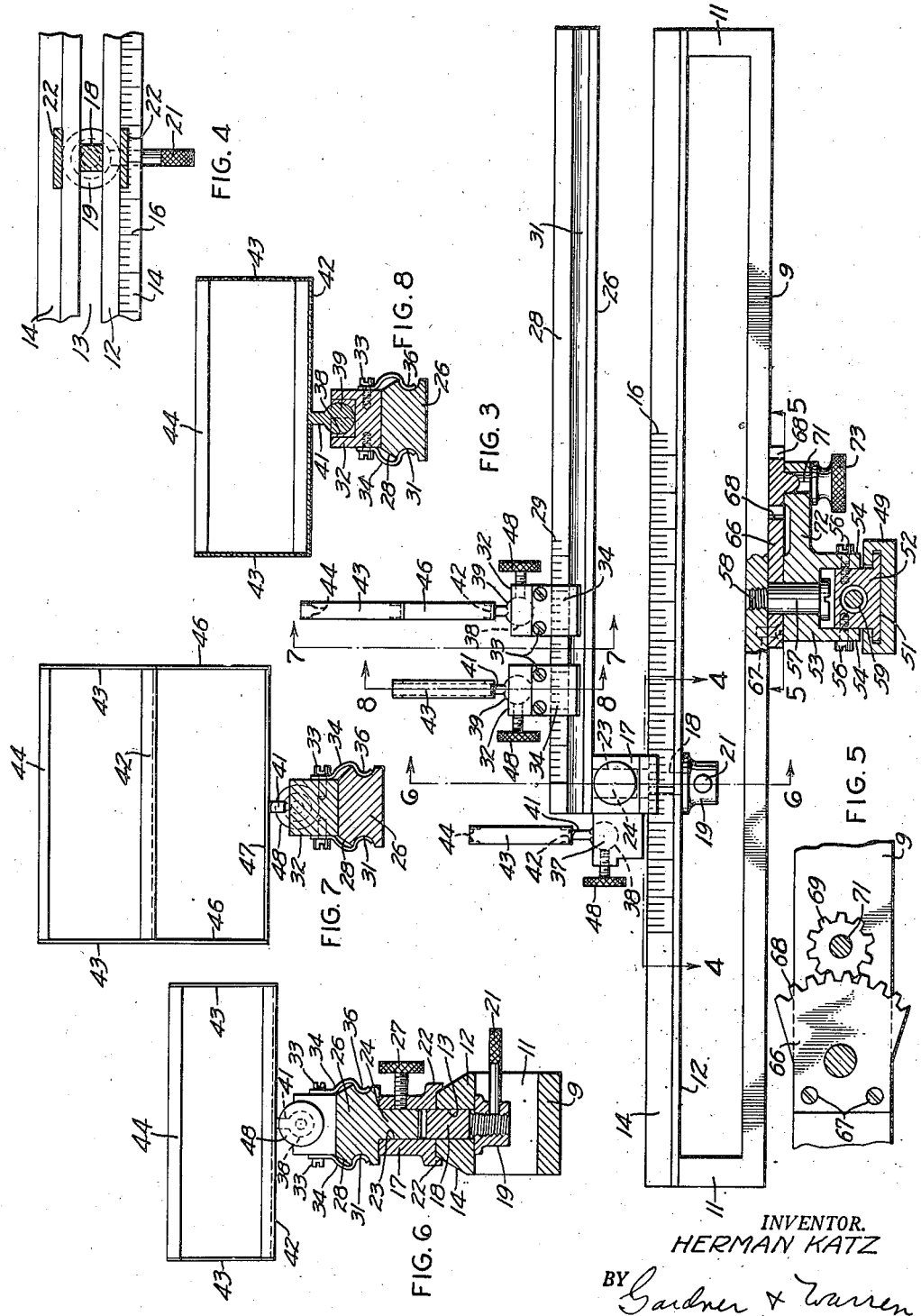

Patented June 21, 1949

2,473,651

UNITED STATES PATENT OFFICE 2,473,651

ADJUSTABLE TARGET STAGE

Herman Katz, Oakland, Calif.

Application November 23, 1945, Serial No. 630,375

7 Claims. (Cl. 128—76.5)

This invention relates to improvements in apparatus for exercising, stimulating, and correcting deficiencies in the muscular and functionary actions of the human eye.

It is an object of the invention to provide, in an eye exercising and training apparatus, wherein the individual eyes are urged to follow pictorially or otherwise denoted targets arranged or displayed in a series of successively varied patterns, means for supporting a plurality of targets relatively adjustable to provide a multiplicity of dissimilarly oriented patterns.

Another object of the invention is to provide, in a machine of the character described, stages or supporting means for several separate targets, to be arranged in a series of predetermined and relatively dissimilar patterns, which supporting means are provided with reference indicia so as to readily facilitate resetting of the mechanism to reproduce a disturbed or temporarily altered pre-existent pattern or grouping of the targets.

A further object of the invention is to provide a target device, for an eye correction or training mechanism, comprising single or duplicate stages each capable of being arranged to provide a predetermined dispersion of individual targets, applicable to the treatment or re-education of the respective eyes, according to correct visual patterns, which may be individually adjusted or unitarily moved as a group relative to the other group to effect, singly or in combination, changes in the lateral spacing therebetween, variations in the linear distances from the target groups to the observer's eyes, or alterations in the symmetrical or asymmetrical angular arrangements between the groups or between each group and a common reference axis passing therebetween and bisecting the distance between the observer's eyes.

Still another object of the invention is to provide an adjustable stage for multiple targets which is reduced to its simplest form and is capable of being set up and adjusted in a minimum of time and with the requirement of no extraordinary skill.

Other objects and features of advantage which, together with the foregoing are embraced in my invention will be specifically set forth in the detailed description of the invention hereunto annexed. It is to be understood that the invention is not to be limited to the specific form thereof herein shown and described as various other embodiments thereof may be employed within the scope of the appended claims.

Referring to the drawings:

Figure 1 is a top plan view of dual adjustable target stages of my invention. Portions of the view are broken away so as to shorten it.

Figure 2 is a vertical sectional view taken in the plane indicated by the line 2—2 of Figure 1. Portions of the view are omitted to condense it.

Figure 3 is a vertical sectional view taken in the plane indicated by the line 3—3 of Figure 1.

Figure 4 is a fragmental horizontal sectional view taken in the plane indicated by the line 4—4 of Figure 3.

Figure 5 is a fragmental horizontal sectional view taken in the plane indicated by the line 5—5 of Figure 3.

Figure 6 is a vertical sectional view taken through the secondary scale pivot and indicated by the line 6—6 of Figure 3.

Figure 7 is a vertical sectional view taken in the plane indicated by the line 7—7 of Figure 3.

Figure 8 is a vertical sectional view taken in the plane indicated by the line 8—8 of Figure 3.

Vision is, in a large measure, a mental process more or less perfectly carried out by the coordination of habits and muscular actions, acquired by experience and developed from infancy, which will hereinafter be referred to as visual patterns. In infancy a human has little or no control over his eyes but rapidly learns fixation or the recognition and remembrance of shapes, texture or composition, triangulation or the determination of distance relative to the size of the object between the latter and the eyes, fusion or the bringing of the lines of sight from the respective eyes together exactly on the object so as to produce two perfectly superimposed mental images giving the impression of a single image, and stereoscopic appreciation which is the perception of depth in the object making it stand out in relief. All of these functions require the employment and cooperative effort of various eye muscles and functions which, under normal conditions, acquire and maintain strength and alacrity in performing habitually the actions which produce accurate and comfortable vision. However, due to early illness, to severe and continued misuse of the eyes, or to other causes, the visual patterns may develop conflicts in control thus impairing the skill and speed in following through their normal sequence of actions with the result that vision in the individual involved becomes an extremely uncomfortable procedure since objects may be blurred or appear to possess a slightly offset ghost, distance is hard to judge and shifting of the gaze from comparatively near to distant objects results in a perceptible interval in which the eyes pass through a sluggish phase of readjustment.

It has been known that where the muscles are not permanently physically injured they, together with correct eye functions, may in the majority of cases be restored by visual re-education to a healthy state of action and coordination resulting in the re-establishment of proper and comfortable vision by special exercises designed to strengthen them and to re-establish the correct skills they have temporarily lost. A machine for accomplishing this corrective therapy and exercising of the eyes and their muscles is fully illustrated and described in my prior Patent No. 2,246,687 and, briefly, comprises targets, to be viewed by the respective eyes, which are caused to move through prescribed courses so that the eyes, singly or in combination, will be independently attracted to follow them and thus cause full and complete exercising of all of the visual functions. The normal operation of this machine provides a uniform cycling of the targets through prescribed paths which, although they may be varied by adjustment of mechanical components of the apparatus, are usually invariably symmetrically repeated for each eye during the exercise period. In many cases it is desirable to subject the eyes to a series of exposures or exercises in which both symmetrical and asymmetrical arrangements of targets are employed so as to bring into play certain muscular actions and cooperations not possible to obtain with the usual mechanisms designed to operate in symmetrical cycles and in other cases superior results may be obtained by the use of relatively fixed rather than moving targets. In either event, the primary aim is to obtain a large number of possible target combinations together with a maximum number of positional arrangements. In the drawings I have shown a device, adapted to be employed either singly or in combination with existing devices utilizing the targets described above, in which a full range of eye exercises may be achieved. The mechanism comprises a pair of identical target stages each comprising a primary slide surmounted by a relatively adjustable secondary slide carrying the various targets. The primary slide comprises an extended base bar 9 having, at its respective ends, upwardly rising posts 11 to the upper ends of which is attached a slide bar 12 paralleling the base bar. The slide bar 12 is provided with a longitudinally extending slot 13 and has sides 14 which are upwardly convergent and provided with regularly spaced indicia 16 providing a primary reference scale. On the slide bar 12 is mounted a pivot block 17 having a stud 18 extending downwardly therefrom, through the slot 13 and terminating in a threaded end portion to which is threadedly connected a clamp nut 19 adapted to be tightened against the underside of the slide bar 12 by a wing lever 21 and thus to secure the pivot block immovably on the slide bar. The lower end of the pivot block is provided with integral flanges 22 extending downwardly and partially over the surfaces 14 so as to prevent rotational movement of the pivot block about a vertical axis and relative to the slide bar. The upper end of the pivot block 17 is provided with a bored socket 23, axially concentric with the stud 18, in which is journaled a pivot stud 24 carried by and depending from one end of a secondary slide bar 26 spaced above and paralleling the primary slide bar 12. A thumb screw 27, penetrating the pivot block 17 into the bore 23 thereof, serves to lock the pivot stud against rotational movement in its socket and consequently to regulate the angular positioning of the secondary slide relative to the primary slide.

Means are provided for supporting and adjustably positioning targets on the respective stages. The secondary slide bar 26 is shaped similarly to the primary slide bar in that it also is provided with upwardly convergent sides 28 bearing reference indicia 29. Semi-circular grooves 31 are formed in the bar and extend longitudinally thereof bordering the lower edges of the inclined surfaces 28. On the upper surface of the secondary slide bar are mounted several independent slide blocks 32 each having attached thereto, by screws 33, leaf springs 34 extending downwardly from opposite sides of each block and provided with bent end portions 36 entering and slidable in the grooves 31. The arrangement of the parts is such that the side pressure of the springs 36 in the grooves together with the downward thrust which the springs exert on the slide blocks will create sufficient friction to sliding movement of the blocks as to securely maintain the latter in various positions into which they may be moved along the slide bar. A fixed block 37, similar to the blocks 32, is formed on and projects from a side of the pivot blocks 17 and is therefore capable of being variably positioned together with the pivot block selectively along the primary slide bar 16. Each of the blocks 32 and 37 is provided, in its upper surface, with a spherical socket 38 which receives the complementary spherical head 39 of an upwardly rising stud 41 carrying a target frame comprising a channel-shaped base bar 42 provided with upwardly extending end strips 43 joined together at their upper ends by spaced parallel cross-member strips 44. The members 42, 43 and 44 form a supporting frame for target cards not shown, which may be interchangeably inserted into the frames through the entrance aperture provided in each between the spaced strips 44. The target frame shown in Figure 7 is specially constructed in that the end strips 43 are provided with integral downward extensions 46 joined to a cross bar 47 carried by the stud 41. The reason for this elevation of the target frame will be evident by reference to Figure 3 wherein it will be seen that it places the rearmost target frame entirely above the plane of the frame immediately in front of it so as to provide full unobstructed vision of the rearmost target. Each of the blocks 32 and 37 is provided with a thumb screw 48 by means of which the spherical heads 39 may be securely clamped in their sockets after gyratory adjustment of the various target frames has been made.

Means is provided for supporting the units comprising the target stages, so that the units may be moved relative to each other in order that the spacing therebetween may be varied as desired, and for pivotally mounting the units so that adjustments in their relative angular relationship may be accomplished. Extending transversely below and positioned substantially medially of the base bar 9 is a base slide 49 having in its upper surface a T-shaped guide groove 51 in which is slidably disposed a pair of complementarily-shaped slide members 52 which are associated, respectively, with and positioned immediately below the target stages. A bracket 53, having lugs 54 attached by screws 56, is connected to and positioned above each slide member 52 and is bored to receive a pivot pin 57 extending upwardly and having an extension 58 threadedly engaged in the base bar 9. The pin 57 mounts the target stage for swinging movement, in a horizontal plane, on the bracket 53. Each slide member 52 is horizontally bored in a direction paralleling the longitudinal dimension of the base slide 49 and is threaded to receive an adjusting screw 59 whose inner end is journaled in a bearing block 61, suitably secured to and rising medially of the length of the base slide, and whose outer end is shouldered to provide a diametrically reduced stem 62 journaled in a fixed bracket 63 secured to the extreme outer end of the base slide. Each adjusting screw 59 is fitted with a grip or knob 64, attached to the stem 62, by means of which the screws may be manually rotated and thus cause relative movement of the target stages bodily toward or from each other. Each of the target stages is provided, as may be seen in Figures 3 and 5, with a quadrant 66 surrounding the pivot pin 57 and interposed between the upper surface of the bracket 53 and the superposed adjacent surface of the base bar 9. Screws 67, passing through the quadrant and into the base bar secure the latter and the quadrant immovably together. The segmental gear 68, formed on the quadrant, meshes with a pinion 69 carried by a downwardly extending shaft 71 which is journaled in an arm 72, formed integrally with and extending from the bracket 53, and is fitted with a knurled knob 73 by means of which the shaft 71 may be manually rotated. Such rotation will cause the quadrant 66 to move pivotally about the axis of the pin 57 and cause a corresponding movement of the overlying target stage, the final result being the positioning of the respective stages at various selected angular positions relative to each other in a horizontal plane. It is to be understood that sufficient frictional resistance to movement of the quadrant may be made inherent in the respective clearances between the parts so that the stages will be stabilized in their various positions of adjustment against the possibility of undesirable movement as the result of vibration or indirect shock.

In order to separate the vision of the patient so that each eye may only view the targets of a single stage, I provide an opaque septum 74, extending longitudinally of and between the stages, which may be retractably extended from a casing 76 carried by the bearing block 61 or other centrally disposed fixed member. The casing 76 may be provided with a storage spool 77 torsionally spring-stressed so as to wind the septum thereon when the latter is retracted; and the outer end of the septum is provided with a ring 78 or other means by which the septum may be attached to and medially of a suitable apertured and hooded eyepiece not shown. The eyepiece, familiar to those skilled in optometry, is used to fixedly position the patient's eyes relative to the respective target stages and to prevent unwanted light rays other than those directly reflected from the targets, from reaching the eyes, and may be used with or without lenses for establishing a predetermined relationship between the patient's eyes and the targets.

In operation, the base slide 49 is secured in any suitable manner to a fixed support as to locate the target stages substantially at the eye level of the patient who is seated in front of the device, provision being made, preferably by fixing the eyepiece or fitting it with correction lenses as previously described, to maintain the patient's eyes in a certain permanent relationship to the apparatus. This being done, the adjusting screws 59 are manipulated so as to position the primary slide bars 12 in relative spaced relation coinciding with the horizontal spacing between the patient's normal converging lines of vision. The knobs 73 are then manipulated so as to swing the primary slide bars 12 into coincidence with the said lines of vision. From diagnostic tests previously conducted, and not forming a function of the present apparatus, the respective target frames on each stage are set as to linear spacing from the patient's eyes and/or relative horizontal spacing between the associated pairs of targets to be used together. In this latter setting, the secondary slide bars 26 may be swung apart or toward each other, depending whether or not the patient's lines of sight are to be diverged or converged during the subsequent exercises. It will be noted that the target frames mounted on the blocks 37 always remain substantially coincident with the vertical plane of the primary slide bars 12. These are the basic targets and are the start and finishing points of each cycle of exercise. Let us suppose that cards, which may be individual stereograms of pairs thereof or which may bear any suitable recognizably similar designs, are in place in the target frames and the septum is in place giving the patient monocular vision of each target stage. The patient is now instructed to shift his gaze at the end of spaced intervals to successive pairs of targets, which will thus call upon the various eye muscles and functions in providing proper fusion of the targets under view, stereoscopic appreciation or depth of image of different degree for the respective eyes depending on the distance setting of the respective targets of the pair viewed, and focusing of the eyes to compensate for the varying distances. In some instances it may be desirable to successively illuminate targets singly or in pairs so as to exercise or stimulate the iris muscles as explained in my above identified prior patent, and in other instances it may be desirable to exercise only one eye by maintaining one set of targets dark while the other set is illuminated. The given setting of the targets may be recorded by noting the positions of the slides and the scale readings so that should it be desired to repeat the exercises at a later time the apparatus may be very rapidly set up without the necessity of making any preliminary tests on the patient.

Having thus described my invention in detail, what I claim as new and desire to secure by Letters Patent is:

1. In eye exercising apparatus including means to divide a patient's vision into two separate fields and to limit monocular vision to a single field, primary guide means in the respective fields and extending generally parallel to the patient's lines of vision in said fields, secondary guide means carried by and movable longitudinally of said primary guide means, means to position said secondary guide means at various positions of angularity with respect to the primary guide means, and targets carried respectively by the primary and secondary guide means and adjustably positionable therealong.

2. In eye exercising apparatus including means to divide a patient's vision into two separate fields and to limit monocular vision to a single field, primary guide means in the respective fields and extending generally parallel to the patient's lines of vision in said fields, secondary guide means carried by and movable longitudinally of said primary guide means, means to position said secondary guide means at various positions of angularity with respect to the primary guide means, and targets carried respectively by the primary and secondary guide means and adjustably positionable therealong, and said targets being disposed at various stages of elevation in vertical planes relative to said lines of vision.

3. In eye exercising apparatus including means to divide a patient's vision into two separate fields and to limit monocular vision to a single field, primary guide means in the respective fields and extending generally parallel to the patient's lines of vision in said fields, secondary guide means carried by and movable longitudinally of said primary guide means, means to position said secondary guide means at various positions of angularity with respect to the primary guide means, a target on each primary guide means and variably positionable therealong, separate targets on each secondary guide means and variably positionable therealong, and said targets being disposed at various stages of elevation in vertical planes relative to said lines of vision.

4. In eye exercising apparatus including means to divide a patient's vision into two separate fields and to limit monocular vision to a single field, primary guide means in the respective fields comprising slide bars extending generally parallel to the patient's lines of vision in said fields, pivot blocks mounted on and movable longitudinally of said slide bars, means to secure said pivot blocks in selected positions of movement thereof, secondary guide means comprising slide bars pivotally mounted on said pivot blocks, means to secure said secondary guide means in selected angular positions relative to said primary guide means, means to move said primary guide means relatively toward and from each other, targets carried by said pivot blocks, additional separate targets carried by and movable along said secondary guide means, and said targets being disposed at various stages of elevation in vertical planes relative to each other.

5. In eye exercising apparatus including means to divide a patient's vision into two separate fields and to limit monocular vision to a single field, primary guide means in the respective fields comprising slide bars extending generally parallel to the patient's lines of vision in said fields, pivot blocks mounted on and movable longitudinally of said slide bars, means to secure said pivot blocks in selected positions of movement thereof, secondary guide means comprising slide bars pivotally mounted on said pivot blocks, means to secure said secondary guide means in selected angular positions relative to said primary guide means, a base slide extending transversely across said fields of vision, slide members carried by said base slide, means to pivotally mount the respective primary guide means on the respective slide members, means to move said slide members in the base slide relatively toward and from each other so as to correspondingly move the primary guide means transversely of said lines of vision, targets carried by said pivot blocks, additional separate targets carried by and movable along the secondary guide means, said targets being disposed at various stages of elevation in vertical planes relative to each other, and means for moving each target universally on its carrier.

6. In eye exercising apparatus including means to divide a patient's vision into two separate fields and to limit monocular vision to a single field, primary guide means in the respective fields comprising slide bars extending generally parallel to the patient's lines of vision in said fields, pivot blocks mounted on and movable longitudinally of said slide bars, means to secure said pivot blocks in selected positions of movement thereof, secondary guide means comprising slide bars pivotally mounted on said pivot blocks, means to secure said secondary guide means in selected angular positions relative to said primary guide means, a base slide extending transversely across said fields of vision, slide members carried by said base slide, means to pivotally mount the respective primary guide means on the respective slide members adjustment screws connected with and to move said slide members in the base slide relatively toward and from each other so as to correspondingly move the primary guide means transversely of said lines of vision, targets carried by said pivot blocks, additional separate targets carried by and movable along the secondary guide means, said targets being disposed at various stages of elevation in vertical planes relative to each other, and means for moving each target universally on its carrier.

7. In eye exercising apparatus including a septum to divide a patient's vision into two separate fields and to limit monocular vision to a single field, primary guide means in the respective fields comprising slide bars having spaced indicia thereon and extending generally parallel to the patient's lines of vision in said fields, pivot blocks mounted on and movable longitudinally of said primary guide means, said pivot blocks being registerable with the primary guide means indicia to identify the relative positions of the pivot blocks and primary guide means, means to secure said pivot blocks in selected positions on said primary guide means, secondary guide means pivotally mounted on said pivot blocks and having spaced indicia therealong, means to secure said secondary guide means on said pivot blocks in selected positions of angularity with respect to the primary guide means, targets carried by said pivot blocks and movable with the latter along the primary guide means, additional separate targets slidably mounted on said secondary guide means, said targets being arranged in various stages of elevation in vertical planes relative to said lines of vision, means to move said targets universally on their respective carriers, a base slide traversing said fields of vision, slide members carried by the base slide and pivotally connected with the respective primary guide means, adjustment screws connected with the respective primary guide means, adjustment screws connected with and to move said slide members transversely of said lines of vision, quadrantal gears carried by each primary guide means and arranged concentrically with the pivotal axis of the primary guide means on said slide members, rotatable adjustment shafts journaled on said slide members, and pinions carried by said shafts and meshing with said quadrantal gears.

HERMAN KATZ.

REFERENCES CITED

The following references are of record in the file of this patent:

UNITED STATES PATENTS

| Number | Name | Date |
|---|---|---|
| 2,203,069 | Woelfel | June 4, 1940 |
| 2,316,139 | Wottring | Apr. 6, 1943 |
| 2,362,857 | Renshaw | Nov. 14, 1944 |

FOREIGN PATENTS

| Number | Country | Date |
|---|---|---|
| 799,811 | France | Apr. 20, 1936 |